US005542301A

United States Patent [19]

Wada

[11] Patent Number: 5,542,301

[45] Date of Patent: Aug. 6, 1996

[54] ELECTROMAGNETIC FLOWMETERS AND METHOD OF PRODUCING ELECTROMAGNETIC FLOWMETERS WITH SLITS TO REDUCE EDDY CURRENTS

[75] Inventor: Ichiro Wada, Kanagawa-ken, Japan

[73] Assignee: Kabushiki Kaisha Toshiba, Kawasaki, Japan

[21] Appl. No.: 440,653

[22] Filed: May 15, 1995

Related U.S. Application Data

[62] Division of Ser. No. 990,072, Dec. 14, 1992, abandoned.

[30] Foreign Application Priority Data

Dec. 20, 1991 [JP] Japan .................................... 3-338245

[51] Int. Cl.[6] ........................................ G01F 1/58

[52] U.S. Cl. ...................................... 73/861.11; 73/861.13

[58] Field of Search .......................... 73/861.12, 861.11, 73/861.13

[56] References Cited

U.S. PATENT DOCUMENTS

| | | | |
|---|---|---|---|
| 3,465,585 | 9/1969 | Wada | 73/194 |
| 3,527,095 | 9/1970 | Wada | 73/194 |
| 3,911,742 | 10/1975 | Kolin | 73/194 EM |
| 4,891,077 | 1/1990 | Roll et al. | 148/95 |
| 5,090,250 | 2/1992 | Wada | 73/861.12 |
| 5,125,276 | 6/1992 | Wada | 73/861.12 |
| 5,275,059 | 1/1994 | Lew et al. | 73/861.15 |
| 5,461,771 | 10/1995 | Wada | 29/602.1 |

FOREIGN PATENT DOCUMENTS

| | | |
|---|---|---|
| 48-44996 | 12/1973 | Japan . |

*Primary Examiner*—Richard Chilcot
*Assistant Examiner*—Jewel V. Artis
*Attorney, Agent, or Firm*—Foley & Lardner

[57] ABSTRACT

Reduced eddy current flowmeters and the methods of fabrication are disclosed. A pedestal is fixed inside an outer casing of the flowmeter and a core is fixed on the pedestal. In one embodiment, the outer casing to which the core is fixed is rotated by a power roller and slits are cut into the core by a laser beam apparatus. The cutting of such slits reduces the eddy current in such flowmeters. Depending on the movement of the laser apparatus with respect to the rotation of the outer casing, a spiral slit or a circular slit may be formed. Other patterns of slits may also be cut. A lathe may be used in place of the laser apparatus. The flowmeter includes an exciting coil, a measuring pipe and other necessary elements which are fixed to the outer casing after the slits are cut in the core.

22 Claims, 10 Drawing Sheets

ELECTROMAGNETIC FLOWMETERS AND METHOD OF PRODUCING ELECTROMAGNETIC FLOWMETERS WITH SLITS TO REDUCE EDDY CURRENTS

This application is a division of application Ser. No. 07/990,072, filed Dec. 14, 1992, now abandoned.

BACKGROUND OF THE INVENTION

1. Field of the Invention

The invention relates to electromagnetic flowmeters containing slits to reduce eddy currents and a method of producing the same.

2. Description of the Related Art

Electromagnetic flowmeters have a laminated core and an outer casing made of a magnetically permeable material which is fixed outside the laminated core. In such flowmeters, a recurrent problem exist in the generation of eddy current in the outer casing. As a result, the occurrence of magnetic flux is delayed and large-sized electromagnetic flowmeters are unable to use coils having reduced exciting frequencies.

Another problem which occurs at reduced exciting frequencies is the presence of (1/f) electrochemical noise. In such cases, it becomes difficult to separate the signal-to-noise ratio.

Because of these problems associated with large-sized electromagnetic flowmeters, the laminated core is fixed inside the outer casing and the fixed laminated core is used as the core of the exciting coil. However, when the laminated core is used as the core, eddy currents are generated which reduces efficiency of operation.

One attempt to reduce eddy currents is to cut partial slits in the core. This method is disclosed in Published Examined Japanese Utility Model Application No. 48-44996. One problem with such a method is that the partial slits are cut in the core prior to being fixed to the outer casing. As a result, the core is not firm, and it is difficult to fix the core to the outer casing.

The above-mentioned Japanese application does not disclose an effective method of cutting the slits in the core nor does it disclose how the core is fixed to the outer casing.

SUMMARY OF THE INVENTION

An object of the invention is to overcome the above-mentioned problems and, in particular, to provide a method of easily and efficiently producing electromagnetic flowmeters having a core that reduces the occurrence of eddy currents.

In order to achieve the above object according to the invention, there is provided a method of producing electromagnetic flowmeters by fixing a magnetic sheet inside an outer casing and subsequently making slits into the fixed magnetic sheet. The slits are positioned in a manner which reduces eddy currents.

By this invention there is provided electromagnetic flowmeters in which a magnetic core is fixed to the inside of an outer casing. A number of slits, some of which extend around the entire inner-circumference of the magnetic core, are cut through the magnetic core in such a way that eddy currents are reduced.

BRIEF DESCRIPTION OF THE DRAWINGS

The accompanying drawings, which are incorporated in and constitute a part of the specification, illustrate the presently preferred embodiments of the invention, and together with the general description given above and the detailed description of the preferred embodiments given below, serve to explain the principles of the invention.

DETAILED DESCRIPTION OF THE PREFERRED EMBODIMENTS

An electromagnetic flowmeter according to an embodiment of the invention will be described with reference to the accompanying drawings.

Figure 1A:
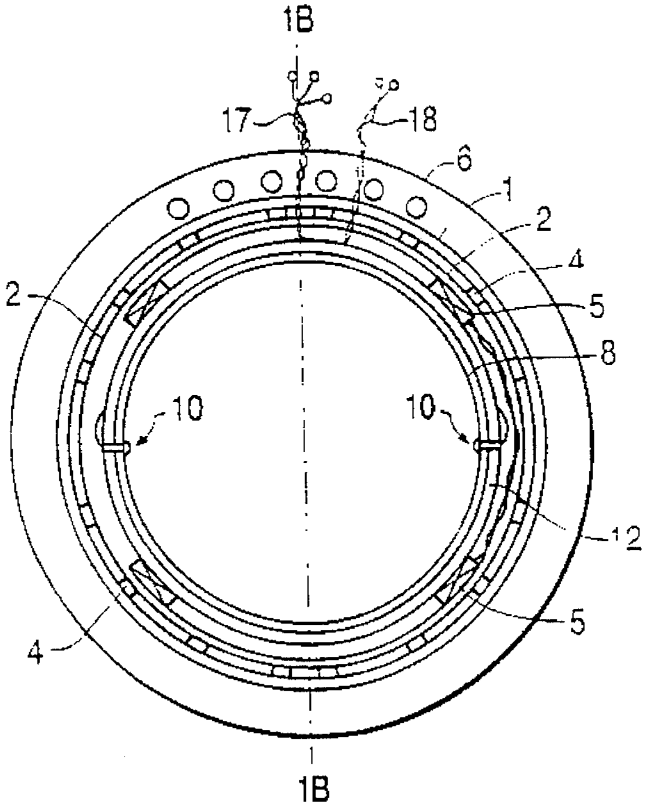
FIG. 1A is a front view showing an electromagnetic flowmeter produced by an embodiment of the invention.
Figure 11:
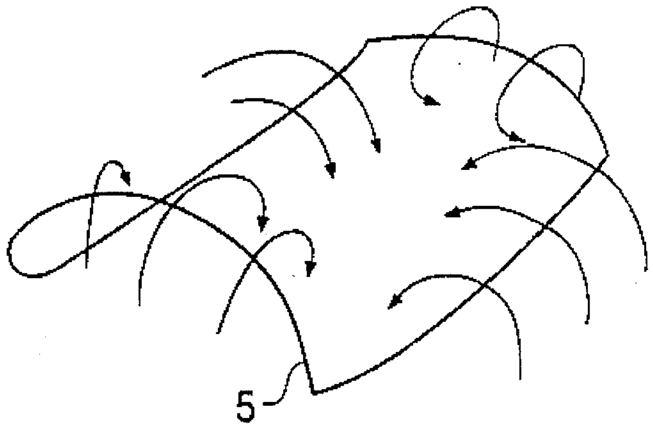
FIG. 11 is a view showing the direction of the magnetic field generated by the exciting coil.

As shown in FIGS. 1A and 11, the electromagnetic flowmeter according to a first embodiment has a pair of saddle-shaped exciting coils 5. Excitation power is provided to the saddle-shaped coils 5 through an excitation line 18. A pair of electrodes 10 are located on a line which crosses the axis of the saddle-shaped coils 5. The electrodes extend through a measuring pipe 12 and its lining 8 so as to come in contact with the fluid flowing through the measuring pipe. Induced electromotive force detected by the electrodes 10 is output exteriorly through a signal output line 17.

A core 2 forms a magnetic path for the saddle-shaped coils 5. The core 2 is fixed in an outer casing 1 through pedestals 4. The core 2 covers the measuring pipe 12. The outer casing 1 has a flange 6.

Figure 1B:
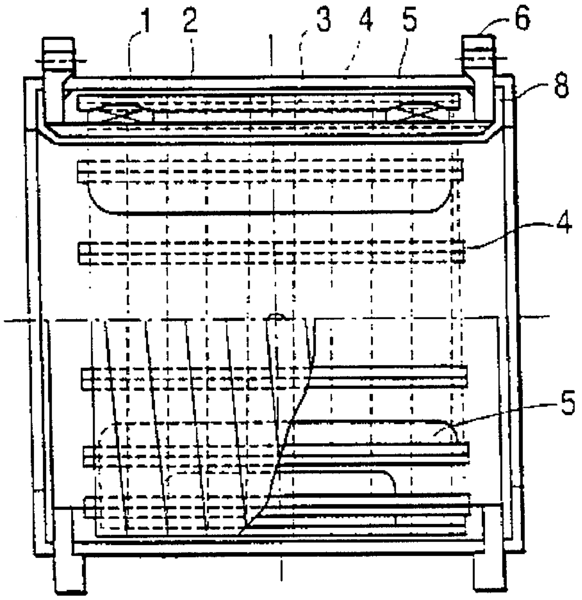
FIG. 1B is a sectional view of FIG. 1A along lines 1B—1B showing the electromagnetic flowmeter produced by an embodiment of the invention.

FIG. 1B is a cross-sectional view of FIG. 1A taken along lines 1B—1B of FIG. 1A. The lining 8, contact electrodes 10, and measuring pipe 12 are removed for clarity. A spiral slit 3 is made in the core 2 in order to reduce eddy currents. A method of producing the electromagnetic flowmeter shown in FIG. 1A and 1B will be described with reference to FIG. 2 through FIG. 9.

Figure 2:
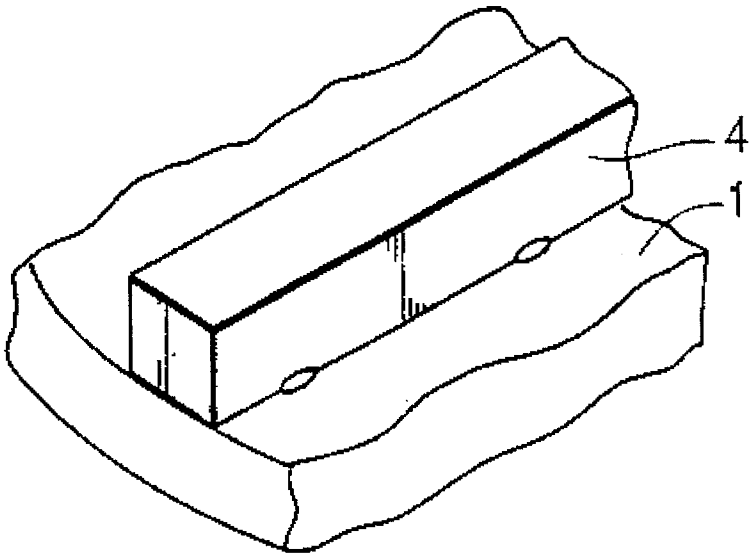
FIG. 2 is a view showing the attachment of the pedestal to the outer casing shown in FIG. 1A and FIG. 1B.

In FIG. 2, the pedestal 4 is fixed inside the outer casing 1 by welding. A point welding is sufficient for such an attachment. The pedestals 4 are fixed at nearly definite intervals about outer casing 1. The outer casing 1 may be made of a magnetic material such as carbon steel SS41 or a non-magnetic material such as austenitic stainless steel SUS316. When the outer casing 1 is made of magnetic material, it is desirable that the pedestal 4 be made of non-magnetic material such as austenitic stainless steel SUS304. When the outer casing 1 is made of non-magnetic material, the pedestal 4 may be made of magnetic material such as carbon steel SS41 or a non-magnetic material such as austenitic stainless steel SUS316.

Figure 3:
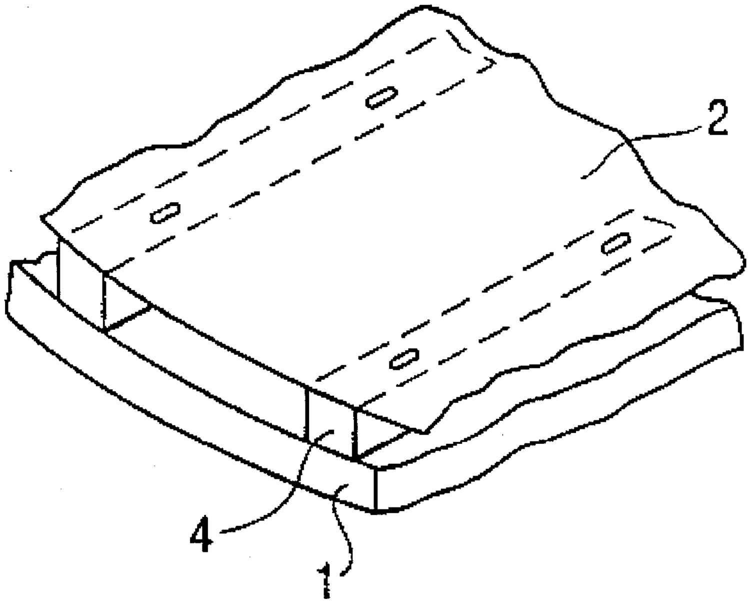
FIG. 3 is a view showing the attachment of the core to the pedestal shown in FIG. 1A and FIG. 1B.
Figure 4:
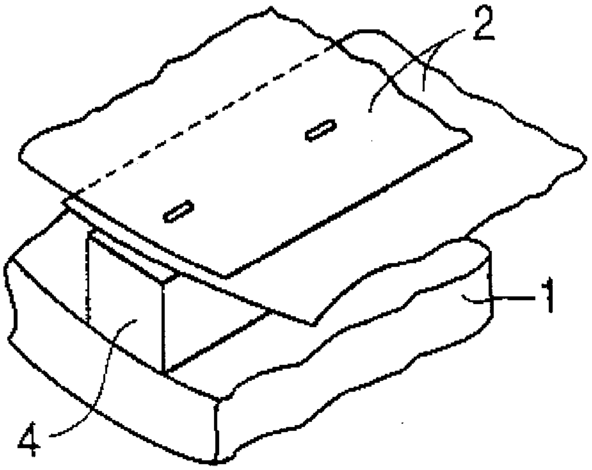
FIG. 4 is a view showing the overlapping and connection of a part of the core shown in FIG. 1A and FIG. 1B.

Once the pedestals 4 are attached to outer casing 1, the core 2 is laid on the pedestals 4 as shown in FIG. 3 and FIG. 4. Overlapping parts of the core 2 are temporarily fixed by point welding. The temporarily fixed overlapping parts are then consecutively welded by a laser apparatus. The preferred core 2 is made of steel including about 3 percent of silicon (Si). The core 2 may also be made of steel such as SS41. By way of example, the thickness of the core 2 may be 1.6 mm, 2.3 mm or 3.2 mm. The thickness is determined by the intensity of the magnetic field generated by the saddle-shaped exciting coil 5.

Figure 5:
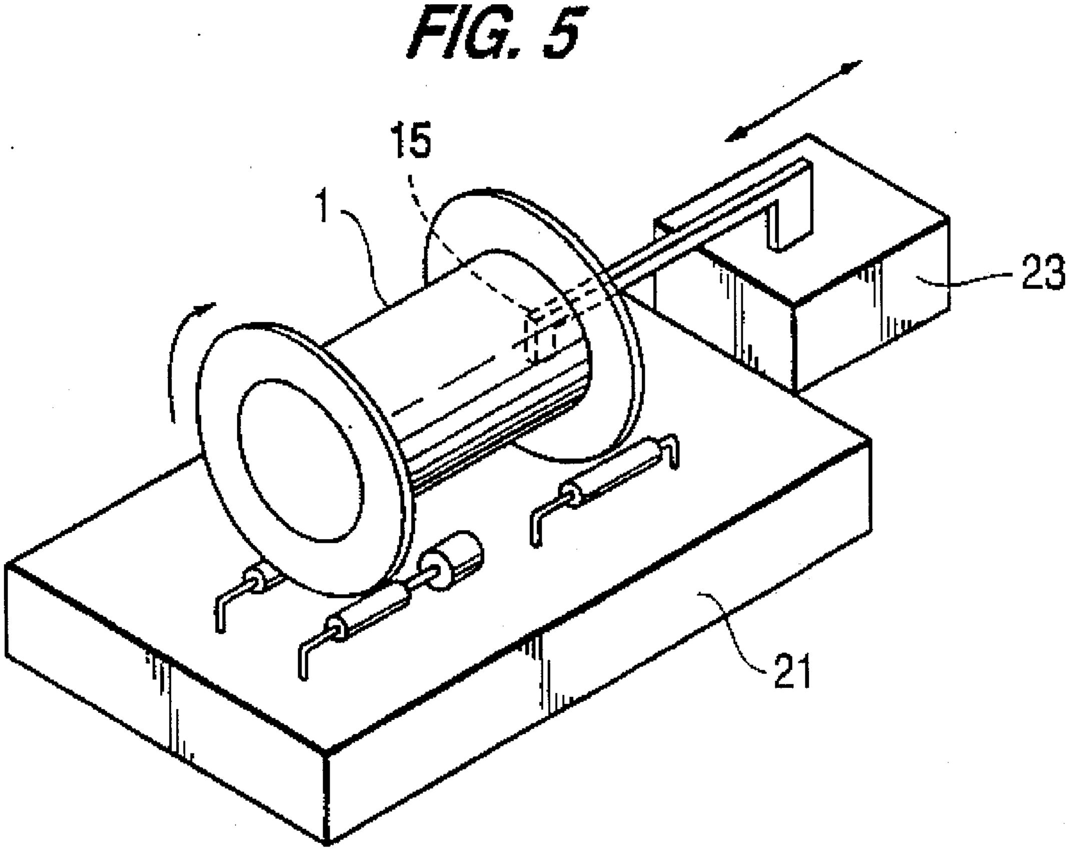
FIG. 5 is a view showing a process using a laser apparatus for making the slit in the core.
Figure 6A:
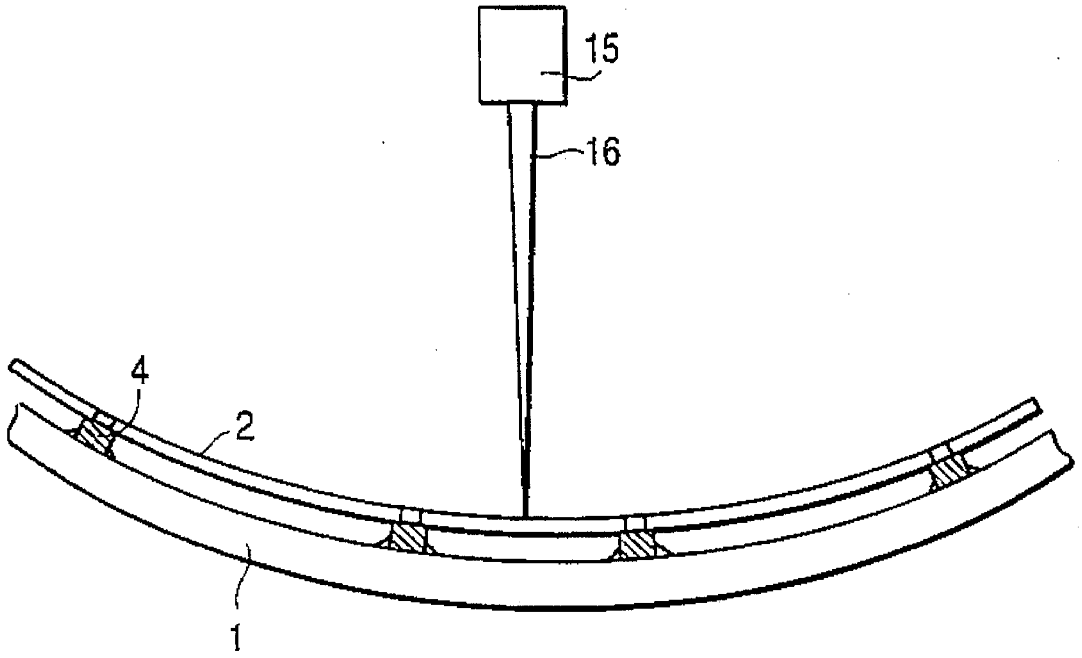
FIG. 6A is a front view showing the irradiation of the core by the laser beams of the laser apparatus.
Figure 6B:
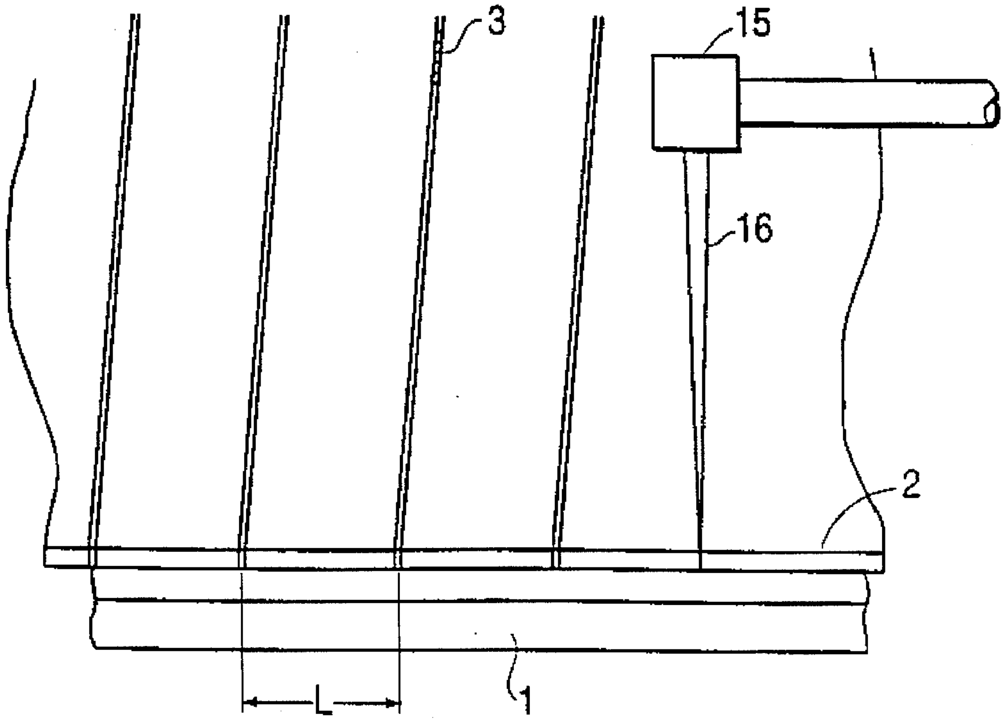
FIG. 6B is a sectional view showing a process of irradiating the core with the laser beams from the laser apparatus.

Slits in the core 2 may be made by the apparatus as shown in FIG. 5. The outer casing 1 to which the core 2 is fixed is rotated by a power roller 21. In this manner, as shown in FIG. 6A and 6B, the slit 3 is made in the core 2 by a laser apparatus 15. As the laser apparatus 15 is moved by a controller 23 according to the rotation of the outer casing 1, a spiral slit is made in the core 2.

Figure 7:
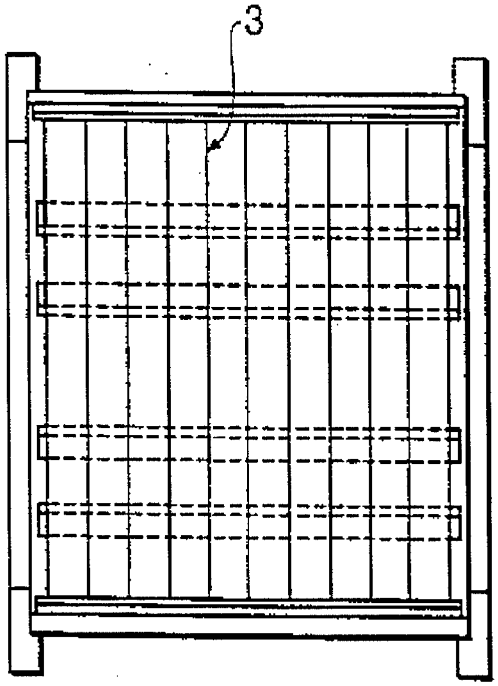
FIG. 7 is a sectional view showing the circular slit made on the core by the laser apparatus.

Alternatively, slits may be formed as shown in FIG. 7 if the laser apparatus 15 is moved intermittently so that circular slits 3 are made on the circumference of the core 2. Securing the core 3 on the casing 1 via the pedestals 4 gives the core 2 sufficient rigidity and support so as to permit fabrication of circular slits.

One problem which may be encountered when cutting these slits is that a complete slit cannot be made because molten matter remains in the part of the slit 3 which overlaps the pedestal 4.

Figure 8:
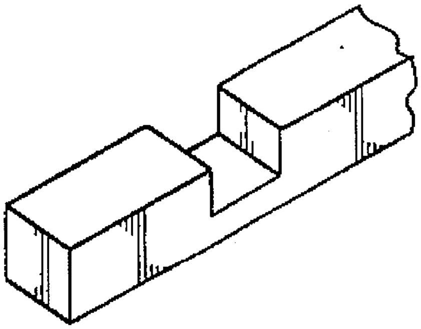
FIG. 8 is a view showing another arrangement of the pedestal shown in FIG. 1A and FIG. 1B.

The above problem of forming incomplete slits may be overcome by using the pedestal shown in FIG. 8. In this case, a recess is formed on the pedestal 4 prior to attachment, and the slit is made to pass over the pedestal at the recess portion thereof. Thus, a complete slit 3 can be formed.

Alternatively or additionally, a material capable of being molten easily by the laser beams may be used as the pedestal 4. In this case, the molten matter created by the laser apparatus can be blown off by air pressure of an oxygen gas (gox) and can be burnt by the oxygen. When such matter is burned by oxygen, there is a dross which sticks to the side of the core opposite of that passed by the laser beam. However, the dross may be removed by striking on the circumference of the outer casing 1 or blowing air along the surface.

Once the slits are made, the exciting coil 5, the measuring pipe 12 and the other elements shown in FIG. 1A are attached to the outer casing 1, and the electromagnetic flowmeter is complete.

Figure 9:
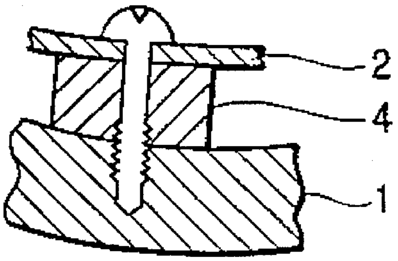
FIG. 9 is a sectional view showing the core attached to the outer casing with a screw.

It is possible to use a material other than metal, for instance resin including fibers such as epoxy resin, as the pedestal 4. In this case, as it is not possible to weld the pedestal 4 to the outer casing 1, nor the core 2 to the pedestal, the core 2 is screwed to the outer casing 1 through the pedestal 4 as shown in FIG. 9.

Since in this embodiment the slits 3 are made by the laser apparatus 15, very little pressure is applied to core 2. Accordingly it is possible to place the pedestals 4 at wide intervals. However, when the pedestals 4 are placed at wide intervals and the intervals of the slits are also formed narrowly, the magnetic field generated during operation of the flowmeter tends to make the core vibrate. This problem can be solved by inserting a filler, such as cloth, between the core 2 and the outer casing 1 and then hardening the filler with a resin.

Figure 10:
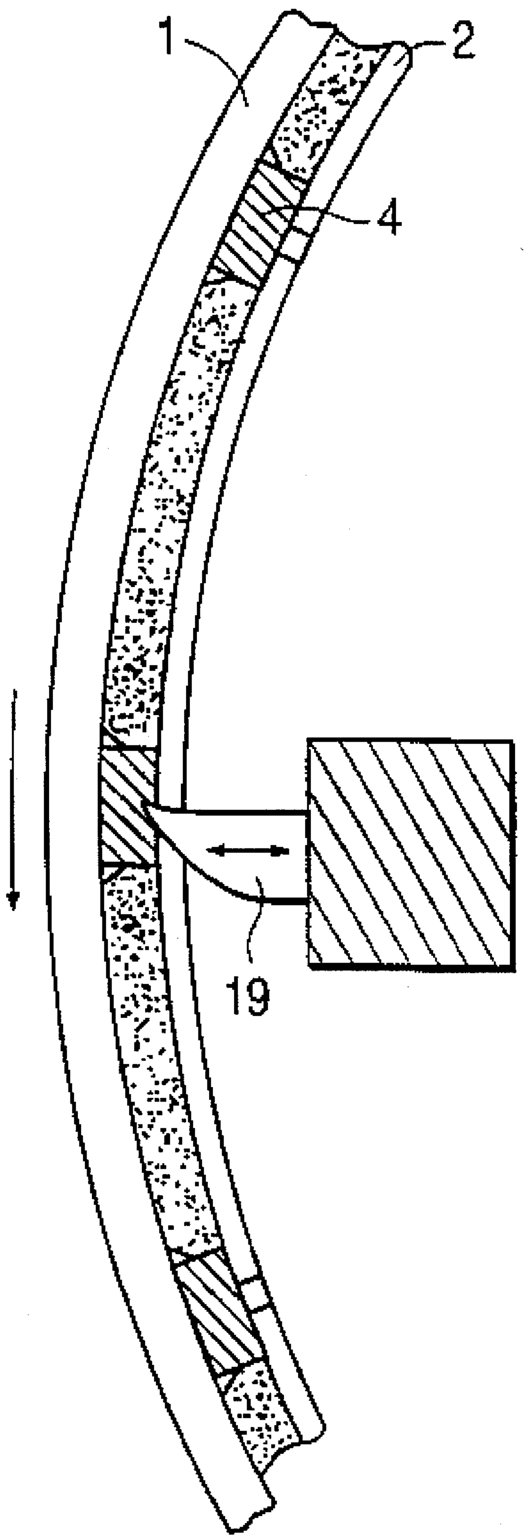
FIG. 10 is a view showing a process making the slit by the lathe.

In the above embodiment, the laser apparatus is used to make the slits. In another embodiment of this invention, the slits may be made by a lathe as shown in FIG. 10. The slit is made as the edge 19 of the lathe cuts into the core 2. A relatively large amount of pressure must be applied to the core 2 in order to cut the slits. Accordingly, the intervals of the pedestals 4 must be more narrow than those in the above embodiment. Alternatively, a fixed layer may be located between the outer casing 1 and the core 2. The fixed layer may consist of a cloth made of glass fiber or polyester fiber hardened by a resin.

A recessed pedestal 4 as shown in FIG. 8 may be used or the pedestal may be made of a material which is capable of being cut by the lathe.

In still other embodiments, the slit may be made by a grinder, a saw-type cutter, or other similar cutting device instead of the edge 19.

Figure 12:
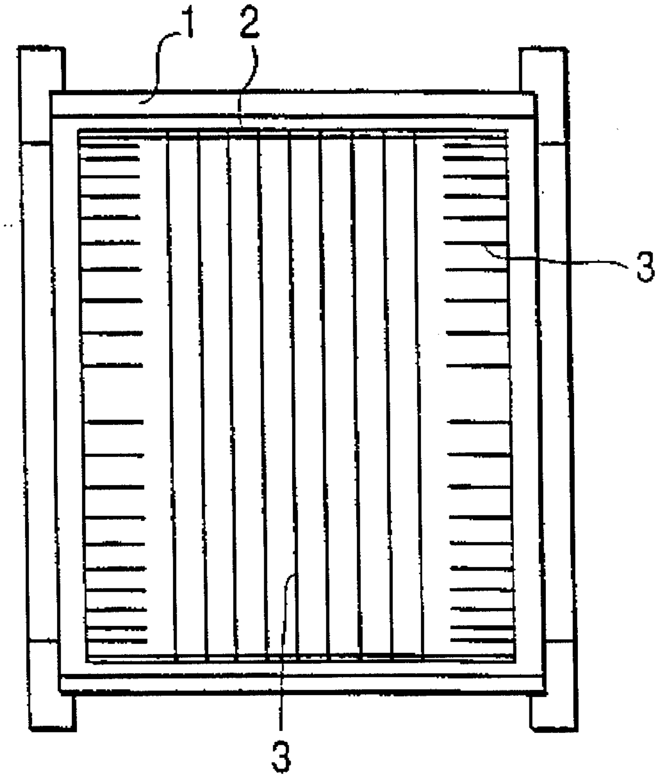
FIG. 12 is a sectional view showing a core having slits in the same direction as the flow direction of the fluid.

In the above described embodiments, the direction of the slits 3 in the core 2 is uniform. However, as shown in FIG. 11, the direction of the magnetic field generated by the exciting coil is not uniform. Accordingly, when the structure of the exciting coil 5 is saddle shaped as shown in FIGS. 1 and 11, the direction of the slits 3 may be changed as shown in FIG. 12. In FIG. 12, the direction of the slits 3 at both ends of the core 2 is made in the same direction as the flow of the fluid. It is, therefore, possible to efficiently reduce eddy currents at the ends of the core as well as in the middle.

Figure 13A:
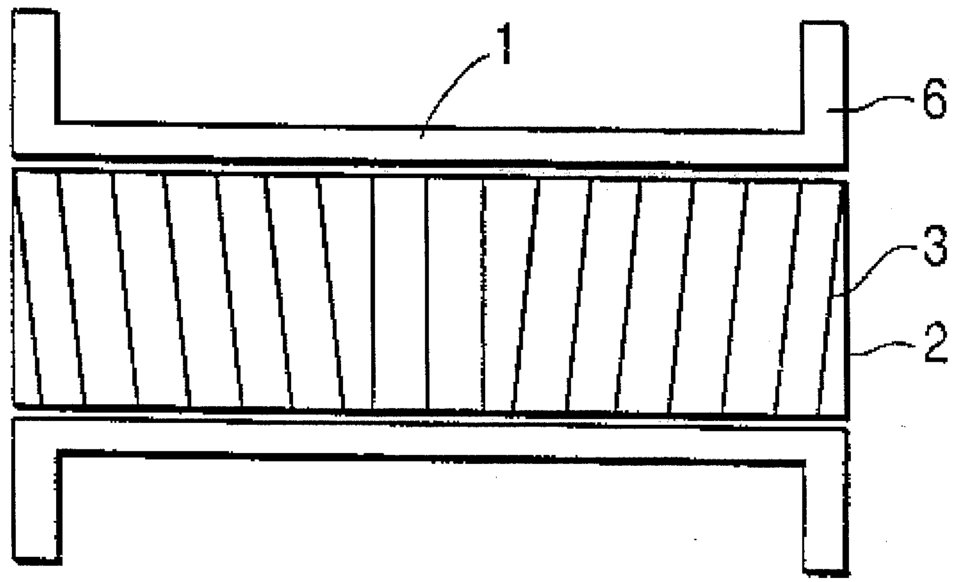
FIG. 13A is a view showing a core having a combination of a circular slit and a spiral slit.
Figure 13B:
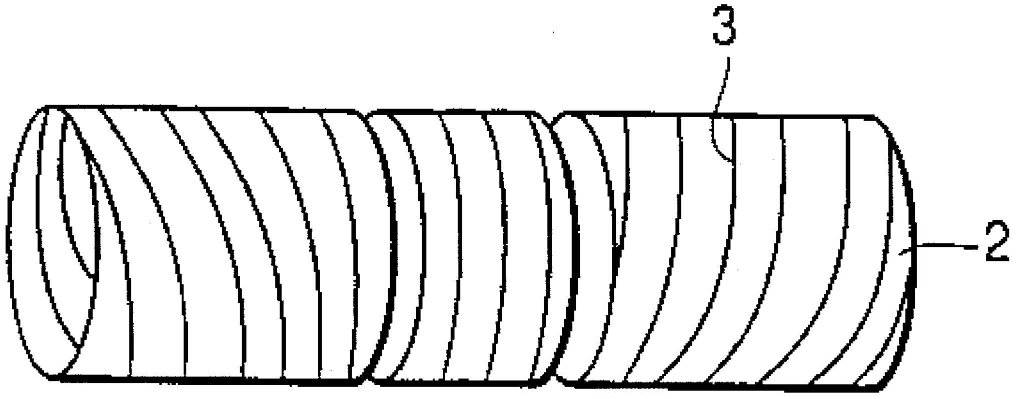
FIG. 13B is a view showing the core having separate magnetic sheets making the circular slit and the spiral slit.

The shape of the slit is not limited to those described in the above embodiments. It is also possible to use various combinations of slit shapes. For instance, as shown in FIG. 13A, circular slits may be made in a middle part of the core and spiral slits may be made in both edge parts of the core. It is also not necessary to construct the core of a single magnetic sheet, rather it may consist of a plurality of magnetic sheets as shown in FIG. 13B comprising different shapes and slits.

Figure 14:
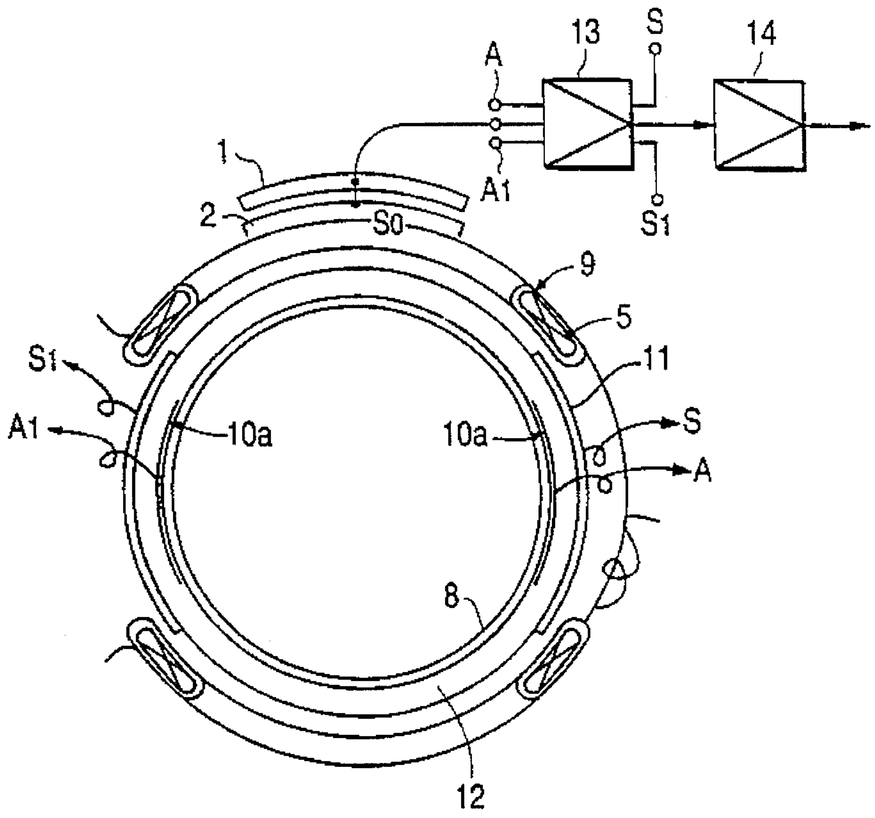
FIG. 14 is a view showing the electromagnetic flowmeter utilizing capacitance-type electrodes.

In the above embodiments, a pair of contact-type electrodes is used to detect the electromotive force. It is also possible to use a pair of capacitance-type electrodes 10*a* as shown in FIG. 14. The contact-type electrodes are in contact with the fluid flowing in the measuring pipe 12 through the lining 8. In contrast, the capacitance-type electrodes need not be in contact with the fluid flowing in the measuring pipe 12 and, therefore, do not need to protrude through the lining 8.

As shown in FIG. 14, the capacitance-type electrodes 10*a* are fixed between the lining 8 and the measuring pipe 12. A feedback shield 11 covering the capacitance-type electrodes 10*a* is attached to the outside of the measuring pipe 12. A ground signal is provided to a preamplifier 13 by a lead connected to the outer casing 1 and core 2 at $S_0$. Leads A and $A_1$ provide signals from electrodes to the preamplifier 13. Because the impedance of the capacitance electrodes 10*a* is high and the impedance of the feedback shields is low, there is a tendency for the signal to leak from the electrodes 10*a* to the shields 11. In order to prevent leakage, electric signals are provided by the preamplifier 13, via leads S and $S_1$, to the feedback shield at a potential equal to the potential of the signals provided by the electrodes 10*a* to the preamplifier 13 by leads A and $A_1$, respectively. Hence, although impedance in the electrodes 10*a* is remarkably high, signals from the electrodes 10*a* do not flow to the feedback shields 11 through capacitance because the feedback shield 11 has the same electric potential.

Preamplifier 13 is a differential amplifier which provides as its output the difference between the signals provided by lead A with respect to ground and lead $A_1$ with respect to ground. The signal outputted by preamplifier 13 is then converted by converting circuit 14 to a signal having a DC current from 4 mA to 20 mA. This signal is then provided to an output device (not shown) which is capable of communicating the information regarding the rate of fluid flow. Such an output device may include, for example, a digital display, an oscilloscope or oscillograph, a computer (via an analog to digital converter), or other similar devices.

Figure 15:
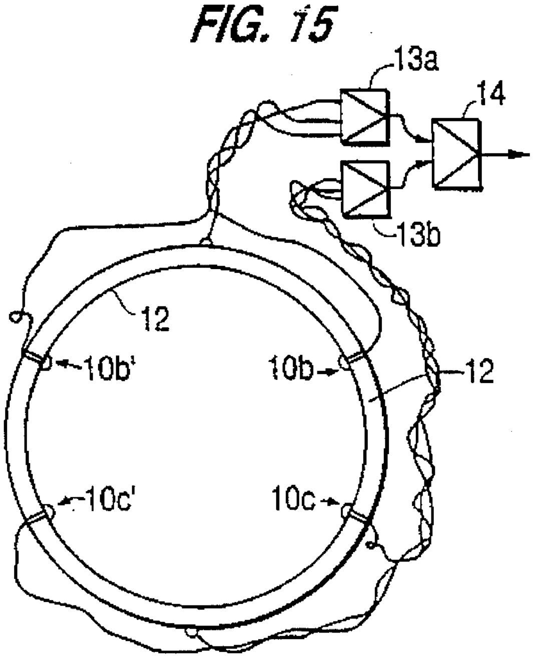
FIG. 15 is a view showing the electromagnetic flowmeter having two pairs of electrodes.

In another embodiment two pairs of the contact-type electrodes are used. In FIG. 15 electrodes 10*b*, b' and electrodes 10*c*, c' form two pairs of electrodes and each signal from electrodes 10*b*, b' and 10*c*, c' is converted into a stable signal by preamplifiers 13*a* and 13*b* respectively. The stable signal is averaged by the converting circuit 14 (including an averaging circuit not shown) and is converted to a signal having a DC current from 4 mA to 20 mA. The signal from converting circuit 14 is then provided to an appropriate output device.

Figure 16A:
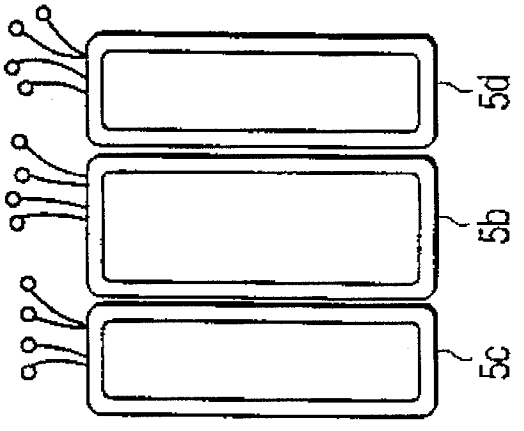
FIG. 16A is a view showing another arrangement of the exciting coil.
Figure 16B:
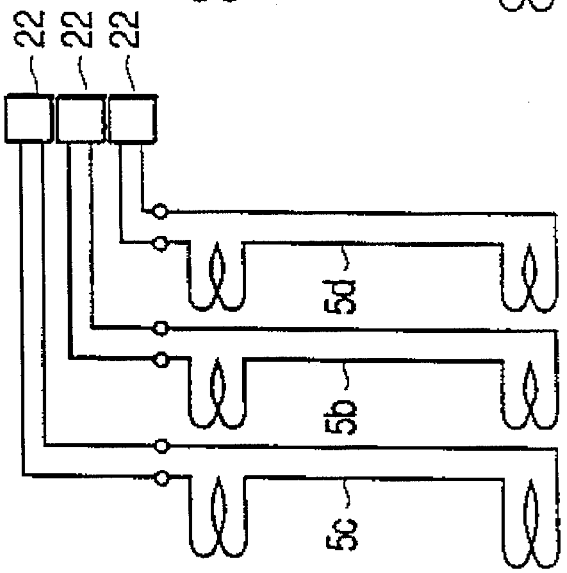
FIG. 16B and FIG. 16C are views showing the method of driving the exciting coil shown in FIG. 16A.
Figure 16C:
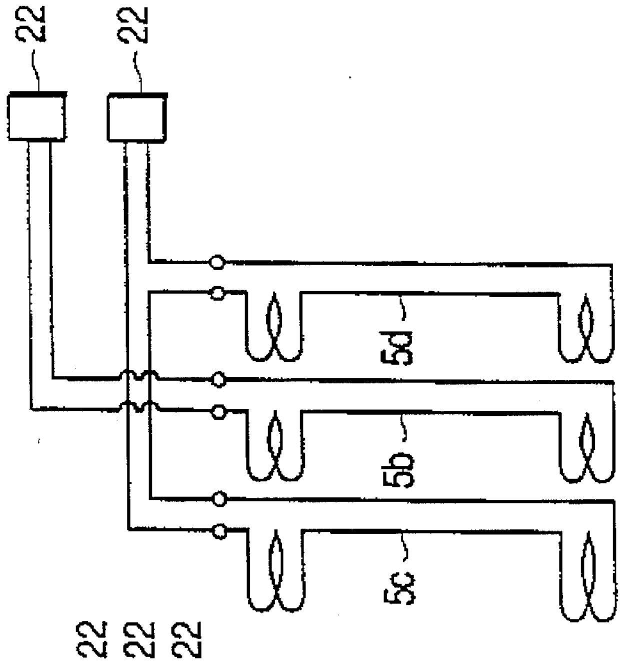

1500 mm-caliber electromagnetic flowmeters or 400 mm~1500 mm-caliber electromagnetic flowmeters used for dredging, require the exciting frequency to be increased, at times, to about 30 Hz. In this case, a coil is divided into a number of pairs and the inductance of each of the divided coils may be controlled. Consequently, an upper side of the exciting coil and a lower side of the exciting coil are formed by individual windings, and may be excited separately. As shown in FIGS. 16A–16C, the upper side and/or lower side of the winding of an exciting coil is divided into parts (e.g., three as shown), and the divided windings may each be excited by separate or shared exciting circuits 22. In this manner, the inductance of each coil of the exciting coil may be controlled (e.g., reduced), and the exciting current rises or falls at a high speed. By this configuration it is possible to increase the exciting frequency and improve measuring precision.

In the above embodiments, the core 2 is fixed to the pedestals 4. However, the invention is not limited to the embodiments described above and pedestals need not be utilized. In this case, either the inside of the outer casing 1, or the surface of the core 2 opposite to the outer casing 1, or both may be magnetically insulated. In this situation, the outer casing 1 may be made from non-magnetic material and may be directly welded to overlap with the core 2 in some places. As before, the slit 3 is formed on the inside of core 2.

A 2400 mm-caliber electromagnetic flowmeter according to the instant invention was produced having an outer casing thickness of 22 mm, a core thickness of 3.2 mm, and slit widths of 0.4 mm±0.2 mm at 10 mm intervals. A prior art electromagnetic flowmeter was used for comparison. The prior art electromagnetic flowmeter had a number of laminated cores made of silicone steel. Each core was made up of 20 silicone sheets, each sheet being 0.35 mm thick, for a total thickness if 7 mm. The cores were 70 mm wide and were spaced apart at 3 mm intervals.

Compared with the prior art electromagnetic flowmeter, the eddy current in the electromagnetic flowmeter produced according to the instant invention and the above specifications is reduced to about one twentieth of the eddy current in the conventional electromagnetic flowmeter.

In accordance with an aspect of the invention, the slits may be formed by a YAG (Yttrium Aluminium Garnet) laser apparatus having an output capacity of 2 KW. The cutting speed is about 1 m/min. (meter per minute). If a $CO_2$ laser apparatus is used, the cutting speed is 3m/min. under the same conditions.

Cutting with a laser produces very little pressure on the core compared to the process of cutting with a lathe. As a result, slits produced by the laser are relatively easy to make while the width of the slits can be quite narrow. This reduces the leakage flux. Since the laser operates at a high temperature while the energy of the laser remains highly concentrated, the residual stress on the core is quite low.

While the above-mentioned advantages of laser cutting are absent when a lathe is used to make the slit, it is still possible to obtain fine cutting precision by using a resin material having a low elasticity as a filler between the core and the outer casing. A slit on the order of 1 mm wide may be made using such a technique.

According to the instant invention, it is possible to easily and efficiently produce electromagnetic flowmeters which generate very small eddy currents. Additional advantages and modifications will readily occur to those skilled in the art. Therefore, the invention in its broader aspects is not limited to the specific details, representative methods, and illustrated examples shown and described herein. Accordingly, various modifications may be without departing from the spirit or scope of the general inventive concept as defined by the appended claims and their equivalents.

What is claimed is:

1. An apparatus for electromagnetically measuring fluid-flow comprising:

a magnetic core;

an outer casing protecting said magnetic core; and means for fixing said magnetic core to said outer casing;

wherein said magnetic core contains a plurality of slits, at least one of said plurality of slits extending around the entire inner circumference of said magnetic core.

2. An apparatus for electromagnetically measuring fluid-flow as recited in claim 1, wherein an outside of said magnetic core is insulated; and said means for fixing said magnetic core to said outer casing comprises means for directly attaching said insulated side of said magnetic core to said outer casing.

3. An apparatus for electromagnetically measuring fluid-flow as recited in claim 1, wherein an inside of said outer casing is insulated; and said means for fixing said magnetic core to said outer casing comprises means for directly attaching said insulated side of said outer casing to said magnetic core.

4. An apparatus for electromagnetically measuring fluid-flow as recited in claim 1, wherein an outside of said magnetic core and an inside of said outer casing are insulated; and said means for fixing said magnetic core to said outer casing comprises means for directly attaching said insulated sides to each other.

5. An apparatus for electromagnetically measuring fluid-flow as recited in claim 1, wherein said means for fixing said magnetic core to said outer casing comprises a plurality of pedestals attached to an inside of said outer casing, and means for attaching said magnetic core to said plurality of pedestals.

6. An apparatus for electromagnetically measuring fluid-flow as recited in claim 5, wherein said pedestals have a plurality of recessed portions.

7. An apparatus for electromagnetically measuring fluid-flow as recited in claim 5, wherein said means for attaching said magnetic core to said plurality of pedestals comprises welding.

8. An apparatus for electromagnetically measuring fluid-flow as recited in claim 1, wherein at least part of said plurality of slits form a spiral pattern.

9. An apparatus for electromagnetically measuring fluid-flow as recited in claim 1, wherein at least part of said plurality of slits form a circular pattern.

10. An apparatus for electromagnetically measuring fluid-flow as recited in claim 1, wherein a first part of said plurality of slits form a spiral pattern positioned in a middle portion of said magnetic core and a second part of said plurality of slits form a pattern running substantially parallel to said fluid-flow at end portions of said magnetic core.

11. An apparatus for electromagnetically measuring fluid-flow as recited in claim 1, wherein a first part of said plurality of slits form a circular pattern positioned in a middle portion of said magnetic core and a second part of said plurality of slits form a pattern running substantially parallel to said fluid-flow at end portions of said magnetic core.

12. An apparatus for electromagnetically measuring fluid-flow as recited in claim 11, wherein a third part of said plurality of said slits forms a spiral pattern.

13. An apparatus for electromagnetically measuring fluid-flow as recited in claim 9, wherein a second part of said plurality of said slits forms a spiral pattern.

14. An apparatus for electromagnetically measuring fluid-flow as recited in claim 1, said apparatus further comprising means for detecting an electromotive force.

15. An apparatus for electromagnetically measuring fluid-flow as recited in claim 14, wherein said means for detecting an electromotive force includes a plurality of contact-type electrodes.

16. An apparatus for electromagnetically measuring fluid-flow as recited in claim 15, said apparatus further comprising:

a plurality of preamplifiers connected to pairs of said plurality of contact-type electrodes, said preamplifiers outputting a plurality of stable signals representitive of input from each pair of said contact-type electrodes; and a converting circuit including an averaging circuit, wherein said plurality of stable signals are averaged by said converting circuit.

17. An apparatus for electromagnetically measuring fluid-flow as recited in claim 14, wherein said means for detecting an electromotive force includes first and second capacitance-type electrodes.

18. An apparatus for electromagnetically measuring fluid-flow as recited in claim 17, said apparatus further comprising:

first and second feedback shields corresponding to said first and second capacitance-type electrodes respectively; and a preamplifier;

wherein said first and said second capacitance-type electrodes provide first and second signals to said preamplifier; and wherein said preamplifier provides third and forth signals to said first and second feedback shields respectively.

19. An apparatus for electromagnetically measuring fluid-flow as recited in claim 18, wherein said first and said third signals have an equal electric potential, and said second and said fourth signals have an equal electric potential.

20. An apparatus for electromagnetically measuring fluid-flow as recited in claim 1, said apparatus further comprises one or more exciting coils, said exciting coils including a plurality of winding parts wherein the inductance of each of said plurality of winding parts can be separately controlled.

21. An apparatus for electromagnetically measuring fluid-flow comprising:

a plurality of magnetic cores;

an outer casing protecting said magnetic cores; and means for fixing said magnetic cores to said outer casing;

wherein at least one of said magnetic cores contains a plurality of slits, at least one of said plurality of slits extending around the entire inner circumference of said magnetic core.

22. An apparatus for electromagnetically measuring fluid-flow as recited in claim 14, wherein at least two of said plurality of magnetic cores contain different slit patterns.

* * * * *